US012041678B2

(12) United States Patent
Xia et al.

(10) Patent No.: US 12,041,678 B2
(45) Date of Patent: Jul. 16, 2024

(54) TRANSMITTING RADIO RESOURCE CONTROL INFORMATION

(71) Applicant: ZTE Corporation, Guangdong (CN)

(72) Inventors: Shuqiang Xia, Guangdong (CN); Feng Xie, Guangdong (CN); Tao Qi, Guangdong (CN); Yan Xue, Guangdong (CN); Kun Cao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 221 days.

(21) Appl. No.: 17/683,035

(22) Filed: Feb. 28, 2022

(65) Prior Publication Data

US 2022/0312536 A1  Sep. 29, 2022

Related U.S. Application Data

(63) Continuation of application No. PCT/CN2019/103667, filed on Aug. 30, 2019.

(51) Int. Cl.
*H04W 76/20* (2018.01)
*H04L 1/00* (2006.01)
(Continued)

(52) U.S. Cl.
CPC ........... *H04W 76/20* (2018.02); *H04L 1/0061* (2013.01); *H04W 72/0446* (2013.01);
(Continued)

(58) Field of Classification Search
CPC . H04W 76/20; H04W 72/23; H04W 72/0446; H04W 72/0466; H04W 80/02; H04L 1/0061
(Continued)

(56) References Cited

U.S. PATENT DOCUMENTS 9,913,264 B2 * 3/2018 Ratasuk .................. H04W 4/70
11,160,090 B2 * 10/2021 He ........................ H04B 7/0632
(Continued)

FOREIGN PATENT DOCUMENTS

CN       102158973 A     8/2011
EP        3316651 A1     5/2018

OTHER PUBLICATIONS

International Search Report and Written Opinion mailed on May 26, 2020 for International Application No. PCT/CN2019/103667, filed on Aug. 30, 2019 (6 pages).
(Continued)

*Primary Examiner* — Anthony Mejia
(74) *Attorney, Agent, or Firm* — Perkins Coie LLP (57) ABSTRACT

Methods, apparatus, and systems for transmitting Radio Resource Control (RRC) layer information without incurring the complex processing in lower layers are described. In one example aspect, a wireless communication method includes scrambling, prior to a Cyclic Redundancy Check (CRC) attachment, at least part of a first Radio Resource Configuration (RRC) message by a base station based on a seed associated with a mobile device. The method also includes transmitting, by the base station, the at least part of the first RRC message at a layer that is lower than a Radio Link Control layer or a Medium Access Control layer over a corresponding channel.

20 Claims, 4 Drawing Sheets

100 scrambling, by a base station, at least part of a first Radio Resource Configuration (RRC) message based on a seed associated with a mobile device
102 transmitting, by the base station, the at least part of the first RRC message at a layer that is lower than a Radio Link Control layer or a Medium Access Control layer over a corresponding channel
104

(51) Int. Cl.
    *H04W 72/044*     (2023.01)
    *H04W 72/0446*     (2023.01)
    *H04W 72/23*     (2023.01)
    *H04W 80/02*     (2009.01)

(52) U.S. Cl.
    CPC ....... *H04W 72/0466* (2013.01); *H04W 72/23* (2023.01); *H04W 80/02* (2013.01)

(58) Field of Classification Search
    USPC .......................................................... 370/329
    See application file for complete search history.

(56) References Cited

U.S. PATENT DOCUMENTS

| | | | |
|---|---|---|---|
| 11,902,963 B2* | 2/2024 | Sosnin | H04L 1/0071 |
| 11,910,433 B2* | 2/2024 | Li | H04W 72/1268 |
| 2018/0324764 A1 | 11/2018 | Bendlin et al. | |
| 2019/0044669 A1 | 2/2019 | Davydov et al. | |

OTHER PUBLICATIONS

NTT Docomo, Inc., "Maintenance for URLLC," 3GPP TSG RAN WG1 Meeting #94, Gothenburg, Sweden, R1-1809146, 28 pages, Aug. 20-24, 2018.

European Search Report issued in EP Patent Application No. 19942809.5, dated Mar. 13, 2023, 8 pages.

Indonesian office action issued in ID Patent Application No. P00202203824, dated Mar. 25, 2024, 4 pages. English translation included.

* cited by examiner

TRANSMITTING RADIO RESOURCE CONTROL INFORMATION

CROSS-REFERENCE TO RELATED APPLICATIONS

This application is a continuation of International Patent Application No. PCT/CN2019/103667, filed on Aug. 30, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for transmitting Radio Resource Control (RRC) layer information without incurring the complex processing in lower layers.

In one example aspect, a wireless communication method is disclosed. The method includes scrambling, prior to a Cyclic Redundancy Check (CRC) attachment, at least part of a first Radio Resource Configuration (RRC) message by a base station based on a seed associated with a mobile device. The method also includes transmitting, by the base station, the at least part of the first RRC message at a layer that is lower than a Radio Link Control layer or a Medium Access Control layer over a corresponding channel.

In another example aspect, a wireless communication method is disclosed. The method includes receiving, by a mobile device, at least part of a first Radio Resource Configuration (RRC) message at a layer that is lower than a Radio Link Control layer or a Medium Access Control layer over a corresponding channel. The at least part of the first RRC message is scrambled prior to a Cyclic Redundancy Check (CRC) attachment based on a seed associated with the mobile device. The method also includes descrambling the second message to determine information about an RRC layer.

The following examples list techniques preferably implemented by some embodiments. In some embodiments, the at least part of the first RRC message is scrambled based on a pseudorandom number generated according to the seed. In some embodiments, the layer includes a Medium Access Control (MAC) layer or a physical layer. In some embodiments, the at least part of the first RRC message is included a Downlink Control Information (DCI). The corresponding channel includes a Physical Downlink Control Channel (PDCCH). The PDCCH may not have any corresponding uplink or downlink data channel. In some embodiments, the at least part of the first RRC message is included in one or more MAC Protocol Data Units (PDUs). The corresponding channel includes a Physical Downlink Shared Channel (PDSCH).

In some embodiments, the seed is predefined according to an identifier of the mobile device. In some embodiments, the identifier includes International Mobile Subscriber Identity (IMSI), Globally Unique Temporary Identifier (GUTI), SAE-Temporary Mobile Subscriber Identify (S-RMSI).

In some embodiments, the method further includes transmitting, by the base station, a second RRC message to the mobile station prior to transmitting the at least part of the first RRC message, wherein the second RRC message includes the seed. In some embodiments, the method further includes notifying the mobile device that the at least part of the first RRC message is to be transmitted at the layer lower than the Radio Link Control layer or the Medium Access Control layer. In some embodiments, the corresponding channel carries information indicating whether there is a change in the at least part of the first RRC message as compared to a previous message.

In some embodiments, the method includes transmitting, from the mobile device, an acknowledgment for the second RRC message to the base station at a first time-domain offset over a physical channel. In some embodiments, the method includes transmitting, from the mobile device, a transaction identifier of the at least part of the first message to the base station at a second time-domain offset over a physical channel. The transaction identifier can be included in X bits of a MAC control element (CE), where X is associated with a maximum value of the transaction identifier. In some embodiments, the first time-domain offset or the second time-domain offset is predefined.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Ultra-reliable low-latency communication (URLLC) is one of the three main use scenarios of the Third Generation Partnership Project (3GPP) New Radio (NR) communication technology. URLLC plays a key role in many areas, such as factory automation, smart city, autonomous driving, public safety, and other wireless communication services. The core performance metric of URLLC is the Packet Error Rate (PER) with information transmission reliability of level 10 to 5, and End-to-End (e2e) transmission delay of 1 ms or less.

Some Layer 3 Radio Resource Control (RRC) messages, such as resource configuration messages, handover messages, etc., become the performance bottleneck for URLLC due to complex processing of multiple protocol layers, such as RRC, Packet Data Convergence Protocol (PDCP), Radio Link Control (RLC), Medium Access Control (MAC), and physical (PHY) layer, on both transmitting and receiving side. In additional, air interface delay and the blurring of RRC message validation time exacerbate the performance issues.

Currently, to meet the performance requirements of the URLLC, it is common to send the above RRC messages with a relatively long timing advance. However, this results in a waste of time-frequency resources. Considering the high reliability and performance requirements of the URLLC services, the existing methods can lead to scarcity of communication resources.

Figure 1:
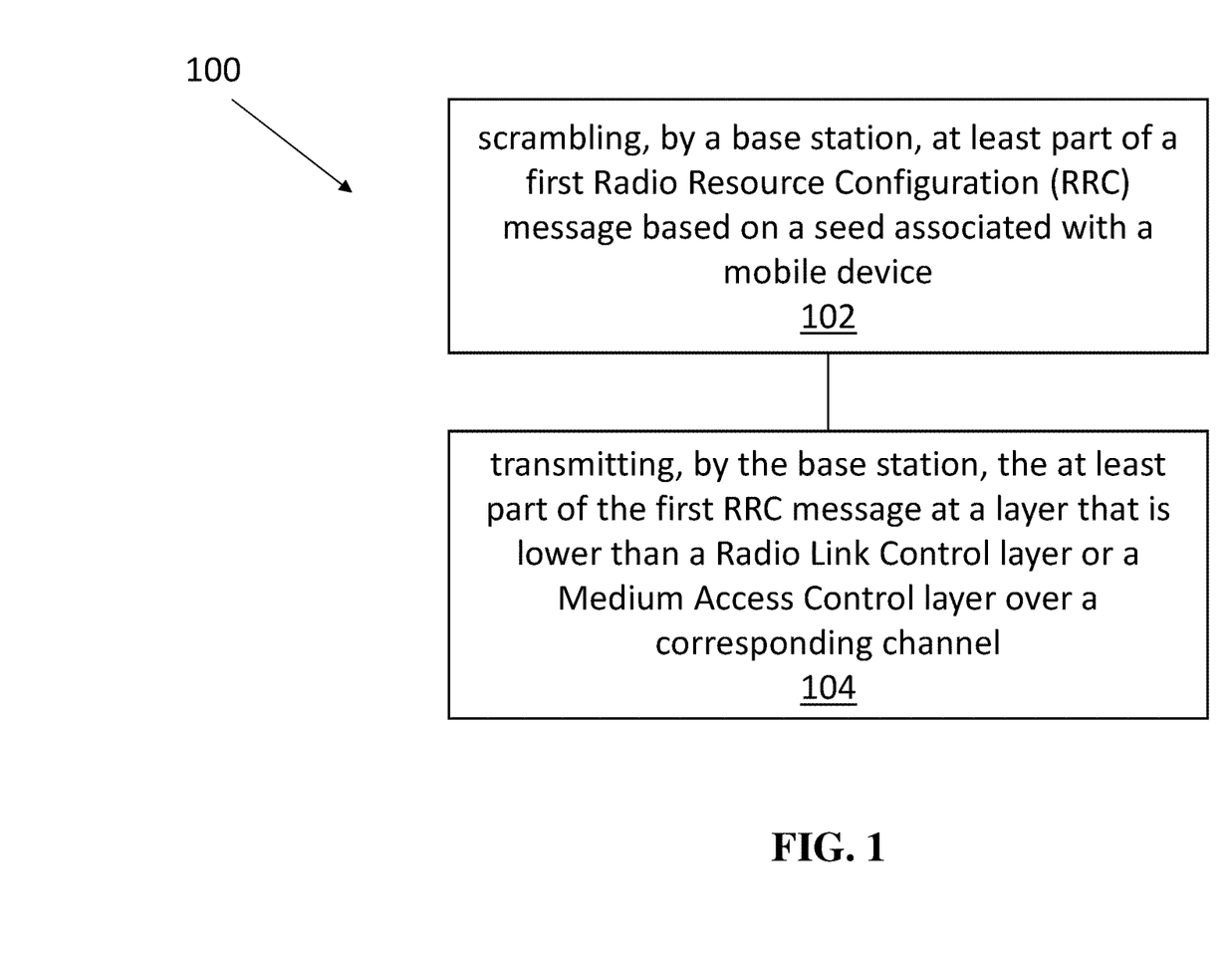
FIG. 1 is a flowchart representation of a wireless communication method in accordance with the present technology.

The techniques disclosed herein can be implemented in various embodiments to reduce delays in transmitting and/or receiving RRC messages. The disclosed techniques can also help minimize or eliminate resource waste in such transmissions. FIG. 1 is a flowchart representation of a wireless communication method 100 in accordance with the present technology. The method 100 includes, at operation 102, scrambling, prior to a physical layer operation, such as a CRC attachment, at least part of a first Radio Resource Configuration (RRC) message by a base station based on a seed associated with a mobile device. The method 100 also includes, at operation 104, transmitting, by the base station, the at least part of the first RRC message at a layer that is lower than a Radio Link Control layer or a Medium Access Control layer over a corresponding channel.

Figure 2:
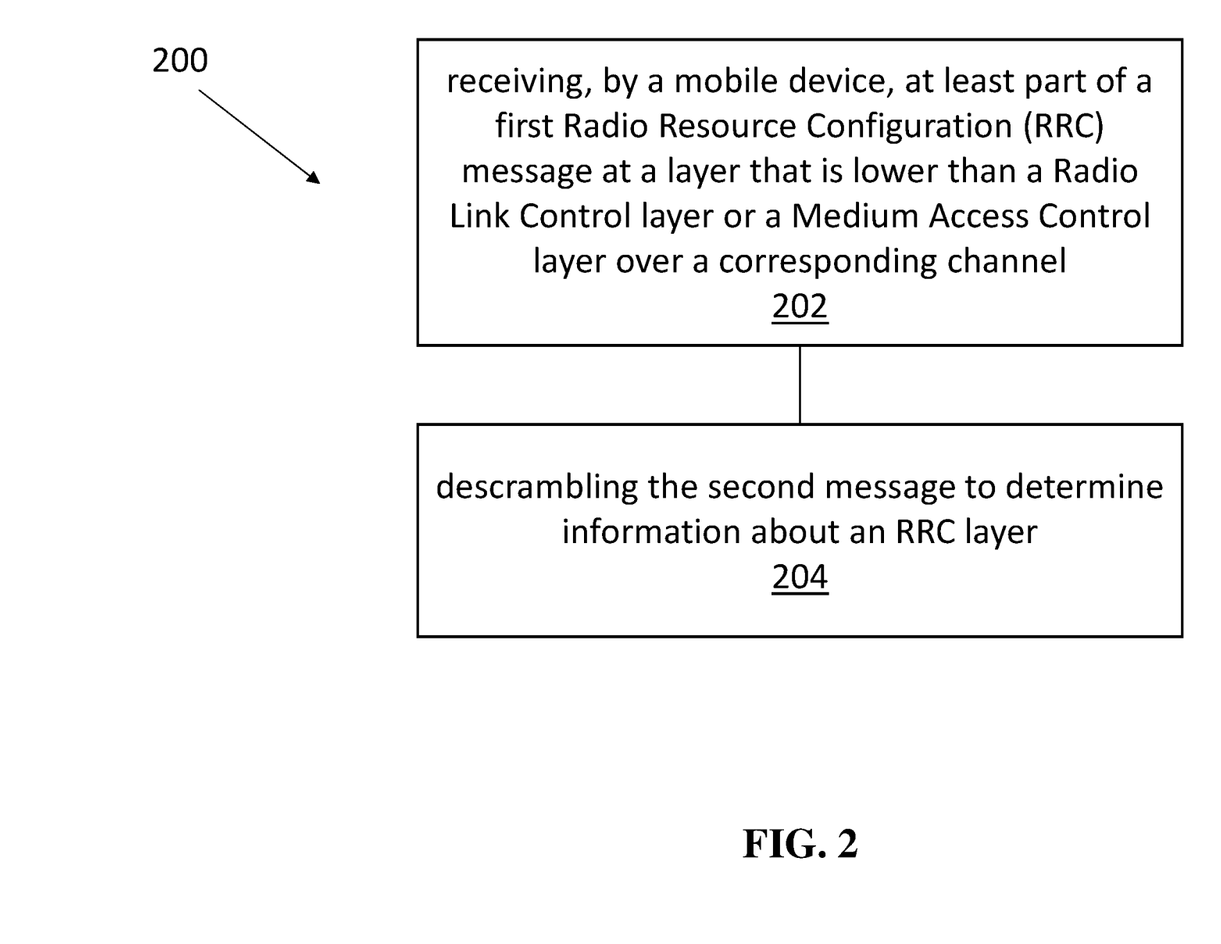
FIG. 2 is a flowchart representation of another wireless communication method in accordance with the present technology.

FIG. 2 is a flowchart representation of a wireless communication method 200 in accordance with the present technology. The method 200 includes, at operation 202, receiving, by a mobile device, at least part of a first Radio Resource Configuration (RRC) message at a layer that is lower than a Radio Link Control layer or a Medium Access Control layer over a corresponding channel. The at least part of the first RRC message is scrambled prior to a physical layer operation, such as a CRC attachment, based on a seed associated with the mobile device. The method 200 also includes, at operation 204, descrambling the second message to determine information about an RRC layer.

The following examples list techniques preferably implemented by some embodiments. In some embodiments, the at least part of the first RRC message is scrambled based on a pseudorandom number generated according to the seed. Scrambling part of the RRC message based on the pseudo-random number increases the level of security of the content. In some embodiments, the layer includes a Medium Access Control (MAC) layer or a physical layer. For example, the at least part of the first RRC message is included a Downlink Control Information (DCI) and the corresponding channel includes a Physical Downlink Control Channel (PDCCH). The PDCCH may not have any corresponding uplink or downlink data channel. As another example, the at least part of the first RRC message is included in one or more MAC Protocol Data Units (PDUs) and the corresponding channel includes a Physical Downlink Shared Channel (PDSCH).

In some embodiments, the seed is predefined according to an identifier of the mobile device. The identifier can include International Mobile Subscriber Identity (IMSI), Globally Unique Temporary Identifier (GUTI), SAE-Temporary Mobile Subscriber Identify (S-RMSI).

In some embodiments, the base station transmits a second RRC message to the mobile station prior to transmitting the at least part of the first RRC message. The seed can be included in the second RRC message. In some embodiments, the base station notifies the mobile device that the at least part of the first RRC message is to be transmitted at the layer lower than the Radio Link Control layer or the Medium Access Control layer. In some embodiments, the corresponding channel carries information indicating whether there is a change in the at least part of the first RRC message as compared to a previous message.

In some embodiments, the mobile device transmits an acknowledgment for the second RRC message to the base station at a first time-domain offset over a physical channel. In some embodiments, the mobile device transmits a transaction identifier of the at least part of the first message to the base station at a second time-domain offset over a physical channel. The transaction identifier can be included in X bits of a MAC control element (CE), where X is associated with a maximum value of the transaction identifier. In some embodiments, the first time-domain offset or the second time-domain offset is predefined.

Some examples of the disclosed techniques are described in the following example embodiments.

Embodiment 1

Currently, an RRC message needs to undergo complex processing of multiple protocol layers. For example, the message needs to be encrypted and integrity protected in the PDCP layer. In the RLC layer, the message is segmented or cascaded and may require retransmission(s). In the MAC layer, logical channel multiplexing can be performed to the message. The PHY layer requires Cyclic Redundancy Check (CRC) attachment, channel coding, modulation, etc. The message is then transmitted to the User Equipment (UE) after all these processing steps are completed, which adds a lot of overhead and increases transmission delay of the message.

To reduce processing complexity and transmission delay, the transmitting side (e.g., the base station) can scramble the information bits included in the RRC message using one or more pseudo-random numbers. In some embodiments, the number of pseudo-random numbers is equal to the number of information bits of RRC message. The one or more pseudo-random numbers can be generated based on a seed and a predefined pseudo-random number generator. In some embodiments, the transmitting side (e.g., the base station) can transmit the seed to the receiving side (e.g., the UE) in another RRC message so that the UE is notified of the seed in advance. In some embodiments, the seed is predefined according to a UE-related identification number, such as International Mobile Subscriber Identity (IMSI), Globally Unique Temporary Identifier (GUTI), SAE-Temporary Mobile Subscriber Identify (S-RMSI), etc.

After the scrambling is completed, the base station can transmit the information bits in Downlink Control Information (DCI) in a corresponding channel, such as the Physical Downlink Control Channel (PDCCH). Here, the PDCCH may not have any corresponding data channel, including the Physical Downlink Shared Channel (PDSCH) and the Physical Uplink Shared Channel (PUSCH). The information bits included in the DCI can be further processed (e.g., CRC attachment, channel coding, and/or modulation) before being transmitted to the UE.

In some embodiments, the transmitting side (e.g., the base station) notifies the receiving side (e.g., the UE) in advance that the information bits for an RRC message is going to be carried by a lower layer (e.g., the PHY layer). In some embodiments, the base station sends such notification in an RRC message, which can optionally include the seed for scrambling. In some embodiments, two separate RRC messages can be used to send the notification and the seed respectively. For example, the notification and the seed can be piggybacked in one or two RRC messages. In some embodiments, an extra field can be added to DCI to indicate whether there is a change in the information bits carried by the PDCCH as compared to the last transmission.

The receiving side (e.g., the UE) can first detects the RRC message(s) that include the notification and/or the seed. Based on the notification, the UE then decode the DCI transmitted over the PDCCH using one or more pseudorandom numbers corresponding to the seed. In some embodiments, the number of pseudo-random numbers is equal to the number of data bits after the PDCCH is decoded. In some embodiments, an additional field in the DCI indicates whether there is a change in the information bit carried by the PDCCH as compared to the last DCI. If there is no change, the detected data can be discarded.

Compared to the existing methods for transmitting RRC information, the method described herein does not require complex processing in layers such as the PDCP, the RLC, and the MAC layer, thereby greatly reducing the transmission delay of the RRC message. Time-frequency resources can also be saved because there is no need to transmit the RRC information with a long timing advance.

The techniques disclosed herein allow transmissions of RRC information to bypass the complex processing in the PDCP, RLC and/or MAC layers while still providing security to the RRC information. For example, a non-target UE may try to decode the RRC information by eavesdropping information transmitted on the PDCCH of the target UE. However, because the non-target UE does not have the UE-specific seed, it cannot correctly descramble the information bits even if it can successfully decode the PDCCH of the target UE.

Embodiment 2

In some embodiments, the transmitting side (e.g., the base station) can transmit some of the information bits of an RRC message using a lower layer. That is, an RRC message can be divided into two or more parts, and at least one part can be transmitted using the PHY layer. This is suitable when part of the information bits in the RRC message changes faster than the remaining part. For example, security-related information typically changes slowly, while fields related to resource allocation change more frequently. The fast-changing part can be carried by the lower layer instead to avoid complex processing and reduce transmission delay.

In some embodiments, the transmitting side (e.g., the base station) can scramble part of the information bits (e.g., the fast-changing portion) included in the RRC message using one or more pseudo-random numbers. In some embodiments, the number of pseudo-random numbers is equal to the number of information bits to be transmitted. The one or more pseudo-random numbers can be generated based on a seed and a predefined pseudo-random number generator. In some embodiments, the transmitting side (e.g., the base station) can transmit the seed to the receiving side (e.g., the UE) in another RRC message so that the UE is notified of the seed in advance. In some embodiments, the seed is predefined according to a UE-related identification number, such as International Mobile Subscriber Identity (IMSI), Globally Unique Temporary Identifier (GUTI), SAE-Temporary Mobile Subscriber Identify (S-RMSI), etc.

After the scrambling is completed, the base station can transmit the selected part of the information bits in Downlink Control Information (DCI) in a corresponding channel, such as the Physical Downlink Control Channel (PDCCH). Here, the PDCCH may not have any corresponding data channel, including the Physical Downlink Shared Channel (PDSCH) and the Physical Uplink Shared Channel (PUSCH). The information bits included in the DCI can be further processed (e.g., CRC attachment, channel coding, and/or modulation) before being transmitted to the UE.

In some embodiments, the transmitting side (e.g., the base station) notifies the receiving side (e.g., UE) in advance that part of the information bits for an RRC message is going to be carried by a lower layer (e.g., the PHY layer). In some embodiments, the base station sends such notification in an RRC message, which can optionally include the seed for scrambling. In some embodiments, two separate RRC messages can be used to send the notification and the seed respectively. For example, the notification and the seed can be piggybacked in one or two RRC messages. In some embodiments, an extra field can be added to DCI to indicate whether there is a change in the information bits carried by the PDCCH as compared to the last transmission.

The receiving side (e.g., the UE) can first detect the RRC message(s) that include the notification and/or the seed. Based on the notification, the UE then decode the DCI transmitted over the PDCCH using one or more pseudorandom numbers corresponding to the seed. In some embodiments, the number of pseudo-random numbers is equal to the number of data bits after the PDCCH is decoded. In some embodiments, an additional field in the DCI indicates whether there is a change in the information bit carried by the PDCCH as compared to the last DCI. If there is no change, the detected data can be discarded.

In some embodiments, the base station can flexibly change the PDCCH payload by configuring a field carried in the PDCCH so that part of the information bits of RRC carried by the PDCCH has the same payload size as other control data carried by the PDCCH in conventional PDSCH/PUSCH scheduling. This way, detection complexity on the receiving side can be reduced.

Embodiment 3

In some embodiments, the transmitting side (e.g., the base station) can transmit at least part of the information bits of an RRC message as one MAC PDU on a corresponding channel, such as the PDSCH. The MAC PDU can include two parts: a MAC subheader and a MAC Control Element (CE). The MAC subheader includes at least one logical channel index and one or more reserved bits. For example, if the MAC subheader includes 8 bits and the logical channel index occupies 6 bits, then the other 2 bits are deemed as reserved bits. The logical channel index is an index corresponding to the MAC CE; different types of MAC CEs have different logical channel indices. The MAC CE can include X bits. X can be a value that is associated with the number of bits transmitted in the MAC PDU. For example, the number of bits transmitted in the MAC PDU is K, and X can be determined as $$X = 8\left\lceil\frac{K}{8}\right\rceil.$$

In some embodiments, the base station scrambles the at least part of the information bits of RRC carried by the MAC CE using one or more pseudo random numbers. The number of pseudo random numbers can be X (that is, the number of bits of the MAC CE). The one or more pseudo-random numbers can be generated based on a seed and a predefined pseudo-random number generator. In some embodiments, the transmitting side (e.g., the base station) can transmit the seed to the receiving side (e.g., the UE) in another RRC message so that the UE is notified of the seed in advance. In some embodiments, the seed is predefined according to a UE-related identification number, such as International Mobile Subscriber Identity (IMSI), Globally Unique Temporary Identifier (GUTI), SAE-Temporary Mobile Subscriber Identify (S-RMSI), etc.

In some embodiments, the transmitting side (e.g., the base station) notifies the receiving side (e.g., UE) in advance that the information bits for an RRC message is going to be carried by a lower layer (e.g., the MAC layer). In some embodiments, the base station sends such notification in an RRC message, which can optionally include the seed for scrambling. In some embodiments, two separate RRC messages can be used to send the notification and the seed respectively. For example, the notification and the seed can be piggybacked in one or two RRC messages. In some embodiments, an extra field can be added to PDU to indicate whether there is a change in the information bits carried by the PDSCH as compared to the last transmission.

Here, the information bits do not need to be processed by the PDCP layer or the RLC layer, thereby reducing processing delay and overhead. Because the information bits are sent by the MAC PDU, in the case of transmission failures, it is convenient to use incremental redundancy to improve the reliability of the transmissions.

Embodiment 4

After the receiving side (e.g., the UE) receives the information bits of the RRC message (carried in a lower layer), the receiving side transmits an RRC transaction identifier corresponding to the information bits to the transmitting side (e.g., the base station). For example, the transaction identifier is defined as k. The UE includes the identifier k in one of the allocated MAC PDUs and transmit it using a corresponding channel (e.g., PUSCH). The MAC PDU can include two parts: a MAC subheader and a MAC Control Element (CE). The MAC subheader includes at least one logical channel index and one or more reserved bits. For example, if the MAC subheader includes 8 bits and the logical channel index occupies 6 bits, then the other 2 bits are deemed as reserved bits. The logical channel index is an index corresponding to the MAC CE; different types of MAC CEs have different logical channel indices. The MAC CE can include X bits. X can be a value that is associated with a maximum value of the transaction identifier, which can be predefined. For example, the maximum value of the transaction identifier is K, and X can be determined as $$X = 8\left\lceil\frac{K}{8}\right\rceil.$$

These X bits (or at least a part of the X bits) can be used to indicate the transaction identifier by the UE. Here are two example ways of transmitting the transaction identifier:

Method 1: The UE uses part of the X bit to indicate the transaction identifier while the remaining bits are set to zero. For example, $\lceil \log_2(K) \rceil$ bits of the X bits can be used to indicate the transaction identifier. In one specific example, K=4. The transaction identifier corresponding to the information bits of the RRC is "01." When X=8, two bits are used to represent the transaction identifier while other bits are set to 0. The MAC CE thus includes "00000001."

Method 2: The UE also uses part of the X bit to indicate the transaction identifier while the remaining bits are set to zero. For example, K bits of the X bits can be used to indicate the transaction identifier. In one specific example, K=4. The transaction identifier corresponding to the information bits of the RRC is "11." When X=8, four bits are used to represent the transaction identifier while other bits are set to 0. The MAC CE thus includes "00001000," using the fourth bit to indicate the value 3. Similarly, a different value of "01" can be indicated as "00000010" using the second bit from the right. In another specific example, the UE receives two sets of information bits corresponding to two RRC messages. The transaction identifiers are "01" and "11" respectively. When X=8, four bits are used to indicate both identifiers. The MAC CE thus includes "00001010," in which "00001000" is used to indicate value "11" and "00000010" is used to indicate value "01." As shown in the specific examples, because Method 2 allows more bits to be used for transmitting transaction identifiers, multiple transaction identifiers can be indicated in a single MAC PDU.

In particular, considering that the NR technology supports Central Unit (CU)-Distributed Unit (DU) split. In the CU-DU split architecture, the PDCP is positioned in the CU. Therefore, the transaction identifier sent by the UE can only be obtained after being processed by the CU, and the MAC related processing is used in the DU. Using the techniques disclosed herein, the transaction identifier sent by the UE can be obtained directly by the DU, thereby bypassing CU to reduce delay and overhead.

Embodiment 5

When the UE receives RRC information sent by the base station, the RRC information may be transmitted in the PDCCH (as shown in Embodiment 1) or in the PDSCH (as shown in Embodiment 2). The UE can transmits an acknowledgment (ACK) in response to the RRC information at time (t1+t2), where t1 represents the last symbol of the PDCCH or PDSCH carrying the RRC information that has been correctly received by the UE, and t2 represents a time-domain offset value, which can be known by both the transmitting and receiving sides. For example, the offset t2 can be in the unit of symbols and indicate a delay of t2 symbols.

In some embodiments, the transaction identifier corresponding to the RRC information is defined as k. The UE can transmit the transaction identifier first available PUCCH or PUSCH resource at time (t1+t2+t3). Here, t3 is another time-domain offset value that can be known by both the transmitting and receiving sides. For example, the offset t3 can be in the unit of symbols and indicate a delay of t3 symbols.

In some embodiments, if there is an available PUSCH resource at (t1+t2+t3), the UE transmits the identifier using the available resource in PUSCH. That is, the PUSCH is given a higher priority over the PUCCH. The base station can pre-configure the resources for transmitting the transaction identifier (e.g., the location and length of the resources). The UE processes the transaction identifier using coding, modulation, and/or rate matching, and maps the processed transaction identifier to the pre-configured resources. In some embodiments, when there is existing user data in the pre-configured resource location, the user data can be replaced by the transaction identifier. When there is no available resource in the PUSCH, the UE can transmit the transaction identifier via the PUCCH using similar operations.

Here, the transaction identifier may be transmitted when there is no available resources on the PUSCH. When there is available PUSCH resources, the transaction identifier is directly mapped to the PUSCH as physical layer signaling. Thus, no additional bits are needed to represent the logical channel index, thereby reducing overhead and processing latency.

Figure 3:
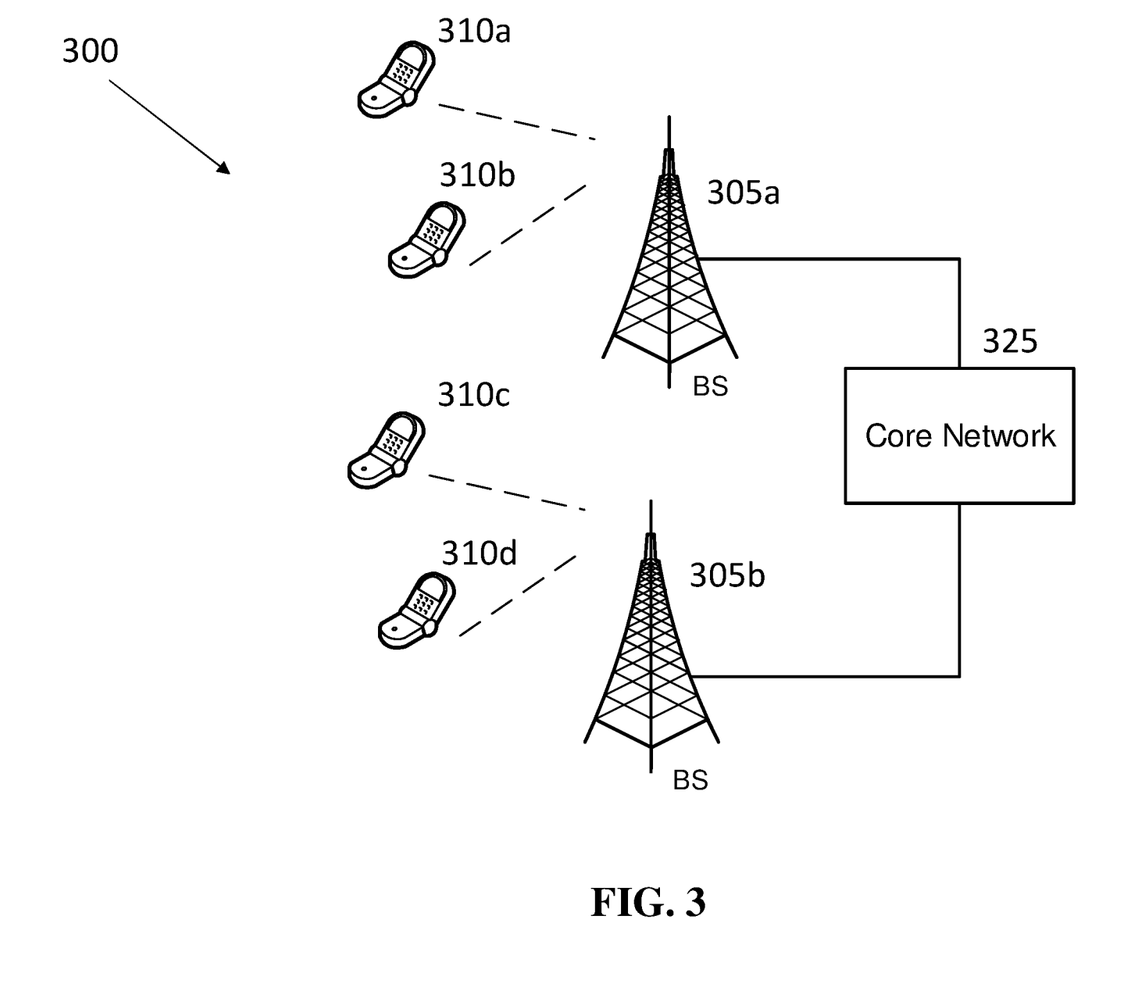
FIG. 3 shows an example of a wireless communication system where techniques in accordance with one or more embodiments of the present technology can be applied.

FIG. 3 shows an example of a wireless communication system 300 where techniques in accordance with one or more embodiments of the present technology can be applied. A wireless communication system 300 can include one or more base stations (BSs) 305a, 305b, one or more wireless devices 310a, 310b, 310c, 310d, and a core network 325. A base station 305a, 305b can provide wireless service to wireless devices 310a, 310b, 310c and 310d in one or more wireless sectors. In some implementations, a base station 305a, 305b includes directional antennas to produce two or more directional beams to provide wireless coverage in different sectors.

The core network 325 can communicate with one or more base stations 305a, 305b. The core network 325 provides connectivity with other wireless communication systems and wired communication systems. The core network may include one or more service subscription databases to store information related to the subscribed wireless devices 310a, 310b, 310c, and 310d. A first base station 305a can provide wireless service based on a first radio access technology, whereas a second base station 305b can provide wireless service based on a second radio access technology. The base stations 305a and 305b may be co-located or may be separately installed in the field according to the deployment scenario. The wireless devices 310a, 310b, 310c, and 310d can support multiple different radio access technologies.

Figure 4:
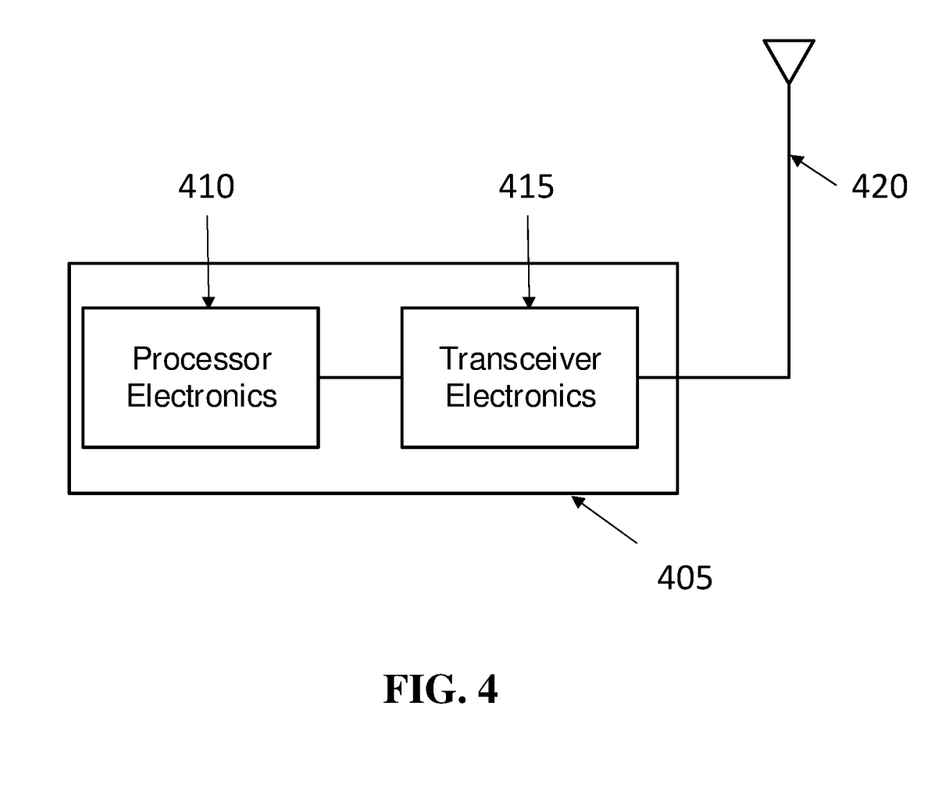
FIG. 4 is a block diagram representation of a portion of a radio station in accordance with one or more embodiments of the present technology can be applied.

FIG. 4 is a block diagram representation of a portion of a radio station in accordance with one or more embodiments of the present technology can be applied. A radio station 405 such as a base station or a wireless device (or UE) can include processor electronics 410 such as a microprocessor that implements one or more of the wireless techniques presented in this document. The radio station 405 can include transceiver electronics 415 to send and/or receive wireless signals over one or more communication interfaces such as antenna 420. The radio station 405 can include other communication interfaces for transmitting and receiving data. Radio station 405 can include one or more memories (not explicitly shown) configured to store information such as data and/or instructions. In some implementations, the processor electronics 410 can include at least a portion of the transceiver electronics 415. In some embodiments, at least some of the disclosed techniques, modules or functions are implemented using the radio station 405.

It will be appreciated that the present document discloses techniques that can be embodied in various embodiments to transmit RRC layer information without incurring the complex processing in PDCP, RLC, and/or MAC layers, thereby reducing processing overhead and delay. The disclosed techniques also uses a UE-specific scrambling mechanism to ensure the security of the information. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising:
   scrambling, prior to a Cyclic Redundancy Check (CRC) attachment, at least part of a first Radio Resource Configuration (RRC) message by a base station based on a pseudorandom number generated according to a seed associated with a mobile device; and
   transmitting, by the base station, the at least part of the first RRC message at a layer that is lower than a Radio Link Control layer or a Medium Access Control layer over a corresponding channel.

2. The method of claim 1, wherein the at least part of the first RRC message is included a Downlink Control Information (DCI), and wherein the corresponding channel includes a Physical Downlink Control Channel (PDCCH).

3. The method of claim 1, wherein the at least part of the first RRC message is included in one or more MAC Protocol Data Units (PDUs), and wherein the corresponding channel includes a Physical Downlink Shared Channel (PDSCH.

4. The method of claim 1, wherein the seed is predefined according to an identifier of the mobile device, the identifier including a International Mobile Subscriber Identity (IMSI), a Globally Unique Temporary Identifier (GUTI), or a SAE-Temporary Mobile Subscriber Identify (S-RMSI).

5. The method of claim 1, further comprising:
   transmitting, by the base station, a second RRC message to the mobile station prior to transmitting the at least part of the first RRC message, wherein the second RRC message includes the seed.

6. A wireless communication method, comprising:
   receiving, by a mobile device, at least part of a first Radio Resource Configuration (RRC) message at a layer that is lower than a Radio Link Control layer or a Medium Access Control layer over a corresponding channel, wherein the at least part of the first RRC message is scrambled prior to a Cyclic Redundancy Check (CRC) attachment based on a pseudorandom number generated according to a seed associated with the mobile device; and
   descrambling a second message to determine information about an RRC layer.

7. The method of claim 6, wherein the at least part of the first RRC message is included a Downlink Control Information (DCI), and wherein the corresponding channel includes a Physical Downlink Control Channel (PDCCH).

8. The method of claim 6, wherein the at least part of the first RRC message is included in one or more MAC Protocol Data Units (PDUs), and wherein the corresponding channel includes a Physical Downlink Shared Channel (PDSCH).

9. The method of claim 6, wherein the seed is predefined according to an identifier of the mobile device, the identifier including a International Mobile Subscriber Identity (IMSI), a Globally Unique Temporary Identifier (GUTI), or a SAE-Temporary Mobile Subscriber Identify (S-RMSI).

10. The method of claim 6, further comprising:
    receiving, by the mobile device, a second RRC message from a base station prior to receiving the at least part of the first RRC message, wherein the second RRC message includes the seed.

11. A wireless communication apparatus comprising a processor and a memory storing instructions, execution of which by the processor causes the apparatus to perform operations comprising:
    scrambling, prior to a Cyclic Redundancy Check (CRC) attachment, at least part of a first Radio Resource Configuration (RRC) message by a base station based on a pseudorandom number generated according to a seed associated with a mobile device; and
    transmitting the at least part of the first RRC message at a layer that is lower than a Radio Link Control layer or a Medium Access Control layer over a corresponding channel.

12. The apparatus of claim 11, wherein the at least part of the first RRC message is included a Downlink Control Information (DCI), and wherein the corresponding channel includes a Physical Downlink Control Channel (PDCCH).

13. The apparatus of claim 12, wherein the at least part of the first RRC message is included in one or more MAC Protocol Data Units (PDUs), and wherein the corresponding channel includes a Physical Downlink Shared Channel (PDSCH.

14. The apparatus of claim 13, wherein the seed is predefined according to an identifier of the mobile device, the identifier including a International Mobile Subscriber Identity (IMSI), a Globally Unique Temporary Identifier (GUTI), or a SAE-Temporary Mobile Subscriber Identify (S-RMSI).

15. The apparatus of claim 14, wherein the operations further comprise:

transmitting a second RRC message to the mobile station prior to transmitting the at least part of the first RRC message, wherein the second RRC message includes the seed.

16. A wireless communication apparatus comprising a processor and a memory storing instructions, execution of which by the processor causes the apparatus to perform operations comprising:

receiving, from a base station, at least part of a first Radio Resource Configuration (RRC) message at a layer that is lower than a Radio Link Control layer or a Medium Access Control layer over a corresponding channel, wherein the at least part of the first RRC message is scrambled prior to a Cyclic Redundancy Check (CRC) attachment based on a pseudorandom number generated according to a seed associated with the wireless communication apparatus; and descrambling a second message to determine information about an RRC layer.

17. The apparatus of claim 16, wherein the at least part of the first RRC message is included a Downlink Control Information (DCI), and wherein the corresponding channel includes a Physical Downlink Control Channel (PDCCH).

18. The apparatus of claim 16, wherein the at least part of the first RRC message is included in one or more MAC Protocol Data Units (PDUs), and wherein the corresponding channel includes a Physical Downlink Shared Channel (PDSCH).

19. The apparatus of claim 16, wherein the seed is predefined according to an identifier of the apparatus, the identifier including an International Mobile Subscriber Identity (IMSI), a Globally Unique Temporary Identifier (GUTI), or a SAE-Temporary Mobile Subscriber Identify (S-RMSI).

20. The apparatus of claim 16, wherein the operations further comprise:

receiving a second RRC message from the base station prior to receiving the at least part of the first RRC message, wherein the second RRC message includes the seed.

* * * * *